(12) United States Patent
Miyahara et al.

(10) Patent No.: US 11,402,314 B2
(45) Date of Patent: Aug. 2, 2022

(54) METHOD FOR INSPECTING SEPARATION MEMBRANE STRUCTURE, METHOD FOR MANUFACTURING SEPARATION MEMBRANE MODULE, AND METHOD FOR MANUFACTURING SEPARATION MEMBRANE STRUCTURE

(71) Applicant: NGK INSULATORS, LTD., Nagoya (JP)

(72) Inventors: Makoto Miyahara, Tajimi (JP); Makiko Ichikawa, Nagoya (JP); Kenji Yajima, Nagoya (JP); Takeshi Hagio, Inazawa (JP)

(73) Assignee: NGK Insulators, Ltd., Nagoya (JP)

( * ) Notice: Subject to any disclaimer, the term of this patent is extended or adjusted under 35 U.S.C. 154(b) by 524 days.

(21) Appl. No.: 16/562,671

(22) Filed: Sep. 6, 2019

(65) Prior Publication Data
US 2019/0391064 A1     Dec. 26, 2019

Related U.S. Application Data

(63) Continuation of application No. PCT/JP2018/005263, filed on Feb. 15, 2018.

(30) Foreign Application Priority Data

Mar. 30, 2017 (JP) .............................. JP2017-068960

(51) Int. Cl.
*G01N 15/08* (2006.01)
*B01D 65/10* (2006.01)

(52) U.S. Cl.
CPC .......... *G01N 15/08* (2013.01); *B01D 65/102* (2013.01); *B01L 2300/0681* (2013.01); *B01L 2300/0832* (2013.01); *B01L 2400/0403* (2013.01)

(58) Field of Classification Search
CPC .. G01N 15/08; G01N 15/082; G01N 15/0826; B01D 65/102; B01D 65/10;
(Continued)

(56) References Cited

U.S. PATENT DOCUMENTS 4,872,974 A     10/1989  Hirayama et al.
10,265,660 B2*   4/2019  Liu .................... B01D 67/0069
(Continued)

FOREIGN PATENT DOCUMENTS

JP     S60-058530 A1     4/1985
JP     H05-157654 A1     6/1993
(Continued)

OTHER PUBLICATIONS

English translation of International Preliminary Report on Patentability (Chapter I) (Application No. PCT/JP2018/005263) dated Oct. 10, 2019, 9 pages.
(Continued)

*Primary Examiner* — Robert R Raevis
(74) *Attorney, Agent, or Firm* — Burr & Brown, PLLC (57) ABSTRACT

A method for inspecting a separation membrane structure includes an assembly step of sealing a separation membrane structure that includes a porous substrate and a separation membrane into a casing, and an inspection step of applying pressure to an inspection liquid that has filled a first main surface side of the separation membrane.

11 Claims, 5 Drawing Sheets

(58) Field of Classification Search
CPC ..... B01L 2300/0681; B01L 2300/0832; B01L 2400/0403
USPC ............ 73/38, 40, 40.7, 46, 49.8, 159
See application file for complete search history.

(56) References Cited

U.S. PATENT DOCUMENTS

| | | |
|---|---|---|
| 2011/0167897 A1 | 7/2011 | Huang et al. |
| 2011/0287261 A1 | 11/2011 | Yajima et al. |
| 2017/0368509 A1 | 12/2017 | Nagasaka et al. |

FOREIGN PATENT DOCUMENTS

| | | |
|---|---|---|
| JP | 2001-242066 A1 | 9/2001 |
| JP | 2004-286635 A1 | 10/2004 |
| JP | 2007-017171 A1 | 1/2007 |
| JP | 2014-046286 A1 | 3/2014 |
| WO | 2010/090049 A1 | 8/2010 |
| WO | 2016/158583 A1 | 10/2016 |

OTHER PUBLICATIONS

International Search Report and Written Opinion (Application No. PCT/JP2018/005263) dated Mar. 27, 2018.

* cited by examiner

METHOD FOR INSPECTING SEPARATION MEMBRANE STRUCTURE, METHOD FOR MANUFACTURING SEPARATION MEMBRANE MODULE, AND METHOD FOR MANUFACTURING SEPARATION MEMBRANE STRUCTURE

TECHNICAL FIELD

The present invention relates to a method for inspecting a separation membrane structure, a method for manufacturing a separation membrane module, and a method for manufacturing a separation membrane structure.

BACKGROUND ART

Typically, a separation membrane structure that includes a porous substrate and a separation membrane undergoes a strength inspection prior to shipping, or a leak inspection is performed after assembly into a module.

Japanese Patent Application Laid-Open No. 5-157654 discloses a method of performing an inspection for separation membrane defects or separation membrane seal faults by supplying a gas under pressure to a second main surface side in a configuration in which a filtrate has filled a first main surface side of a separation membrane that has been assembled into a module.

However, the method in Japanese Patent Application Laid-Open No. 5-157654 has the problem of the high costs required for the large amount of pressurized gas for the inspection.

Japanese Patent Application Laid-Open No. 2014-46286 discloses a method of performing an inspection of the strength of a separation membrane by pressurizing a liquid that has been filled onto a first main surface side of a separation membrane.

SUMMARY

However the method disclosed in Japanese Patent Application Laid-Open No. 2014-46286 has the problem that attachment of the liquid to the pores of the separation membrane reduces the permeation characteristics of the separation membrane after inspection.

The present invention is proposed in light of the situation described above, and has the object of providing a method for inspecting a separation membrane structure, a method for manufacturing a separation membrane module, and a method for manufacturing a separation membrane structure that can inhibit a reduction in the permeation characteristics of a separation membrane.

Solution to Problem

A method for inspecting a separation membrane structure according to the present invention includes an assembly step of sealing a separation membrane structure that includes a porous substrate and a separation membrane into a casing, and an inspection step of applying pressure to an inspection liquid that has filled a first main surface side of the separation membrane.

The present invention enables provision of a method for inspecting a separation membrane structure, a method for manufacturing a separation membrane module, and a method for manufacturing a separation membrane structure that can inhibit a reduction in the permeation characteristics of the separation membrane.

DESCRIPTION OF EMBODIMENTS

Separation Membrane Module 10

Figure 1:
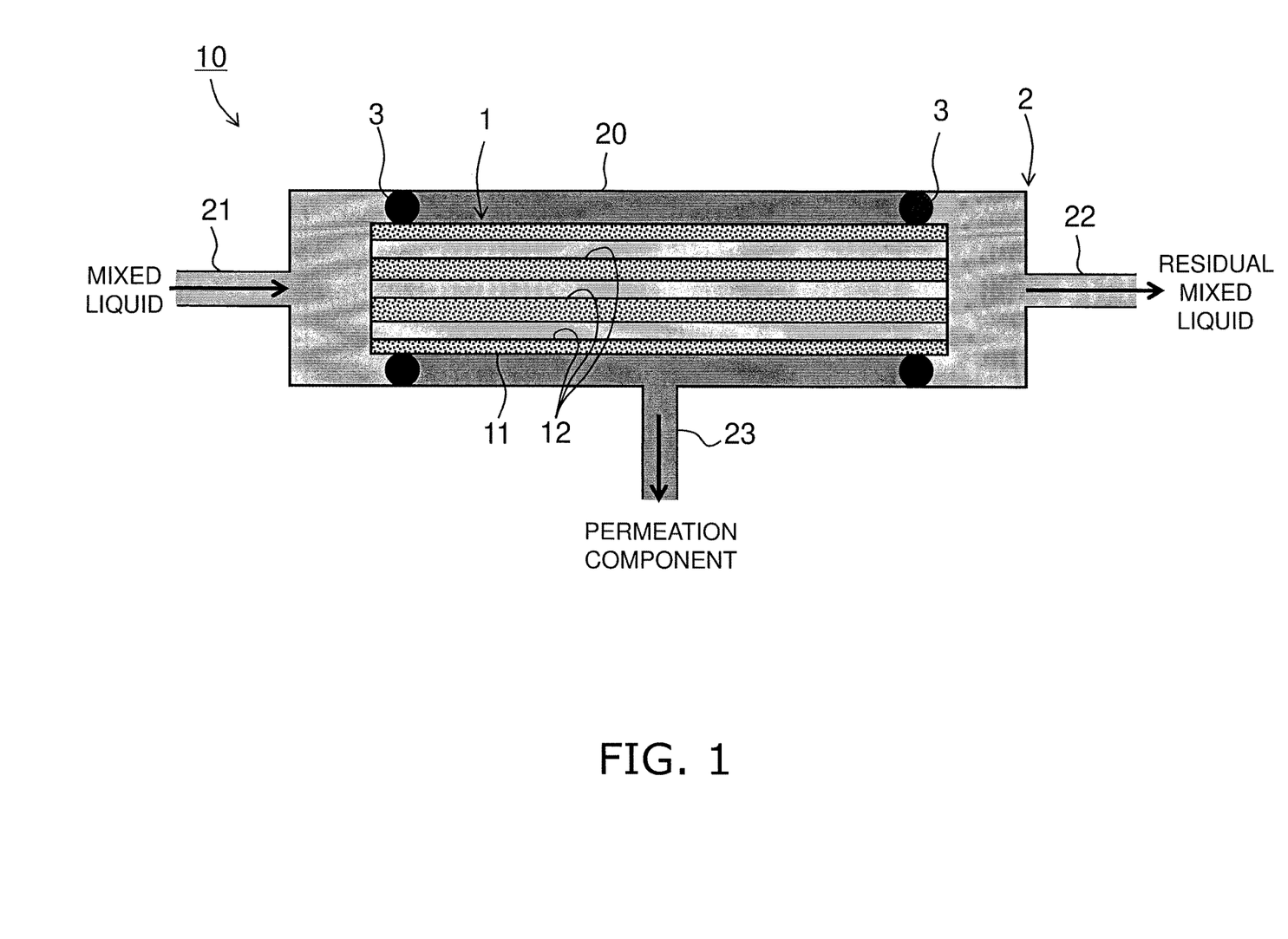
FIG. 1 is a sectional view of a separation membrane module.

FIG. 1 is a sectional view of a separation membrane module 10. The separation membrane module 10 includes a separation membrane structure 1 and a casing 2.

1. Separation Membrane Structure 1

The separation membrane structure 1 has a monolithic configuration. A monolithic configuration denotes a shape in which a plurality of cells penetrates in a longitudinal direction and includes a concept such as a honeycomb. The separation membrane structure 1 is disposed in an inner portion of the casing 2.

The separation membrane structure 1 includes a porous substrate 11 and a separation membrane 12.

The porous substrate 11 is formed in a cylindrical shape that extends in a longitudinal direction. A plurality of cells CL is formed in an inner portion of the porous substrate 11. Each cell CL extends in a longitudinal direction. Each cell CL is connected to both end faces of the porous substrate 11.

The porous substrate 11 is composed of a binder and an aggregate. The aggregate includes use of alumina, silicon carbide, titania, mullite, potsherd, and cordierite or the like. The binder includes use of at least one of an alkali metal and an alkaline earth metal, and a glass material containing aluminum (Al) and silicon (Si). The content ratio of the binder in the substrate 11 may be greater than or equal to 20 vol % and less than or equal to 40 vol %, and preferably greater than or equal to 25 vol % and less than or equal to 35 vol %.

Although there is no particular limitation in relation to the porosity of the porous substrate 11, it may be configured for example as 25% to 50%. The porosity of the porous substrate 11 may be measured by mercury porosimetry. Although there is no particular limitation in relation to the average pore diameter of the porous substrate 11, it can be set to 0.1 µm~50 µm. Depending on the size of the pore diameter, the average pore diameter of the porous substrate 11 may be measured by mercury porosimetry, an air flow method described in ASTM F316, or by perm-porometry.

The separation membrane 12 is formed on the inner surface of each cell CL. The separation membrane 12 is formed in a cylindrical shape. The separation membrane 12 enables permeation of a permeation component that is contained in a mixed liquid that is the object of a separation process. The mixed liquid is supplied to an inner surface side of the separation membrane 12 and a permeation component flows out from an outer surface side of the separation membrane 12. The inner surface side of the separation membrane 12 is also an inner surface of a cell CL. The outer surface side of the separation membrane 12 is a contact surface with the porous substrate 11. In the present embodiment, the inner surface side is an example of "a first main surface" and the outer surface side of the separation membrane 12 is an example of "a second main surface."

It is noted that the mixed liquid that is the object of a separation process may be a mixed gas or a mixed liquid. However the present embodiment assumes in particular that a mixed liquid is the object of the separation process.

The separation membrane 12 includes a zeolite membrane (for example, reference is made to Japanese Patent Application Laid-Open No. 2004-66188), a silica membrane (for example, reference is made to the pamphlet of PCT Laid Open Application 2008/050812 pamphlet), a carbon membrane (for example, reference is made to Japanese Patent Application Laid-Open 2003-286018), an organic-inorganic hybrid membrane (for example, reference is made to Japanese Patent Application Laid-Open 2013-203618), and a ceramic membrane (for example, reference is made to Japanese Patent Application Laid-Open 2008-246304), or the like.

The average pore diameter of the separation membrane 12 may be suitably determined on the basis of a required filtration performance and separation performance, and for example may be configured as 0.0003 μm~1.0 μm. The inspection method of the present application exhibits particular utility in relation to a separation membrane that has an average pore diameter of less than or equal to 10 nm, and is also useful in relation to a separation membrane that has an average pore diameter of less than or equal to 1 nm. A suitable selection method may be selected in relation to the average pore diameter of the separation membrane 12 depending on the size of the pore diameter.

For example, when the separation membrane 12 is a zeolite membrane, the average pore diameter is taken to be the arithmetic average of the major diameter and the minor diameter of an oxygen n-membered ring pore having a backbone forming the pores of the zeolite that is constituted by a ring of less than or equal to the oxygen n-membered ring. The oxygen n-membered ring has a number n of oxygen atoms that configure the backbone forming the pore, includes at least one of an Si atom, Al atom or P atom, and is a moiety that forms a ring structure in which the respective oxygen atoms are bound with a Si atom, an Al atom, a P atom, or the like. When the zeolite has a plurality of oxygen n-membered ring pores in which n takes the same value, the average pore diameter of the zeolite is taken to be the arithmetic average of the major diameter and the minor diameter of all the oxygen n-membered ring pores. In this manner, the average pore diameter of a zeolite membrane is uniquely determined with reference to the backbone structure and can be calculated with reference to the values disclosed in The International Zeolite Association (IZA) "Database of Zeolite Structures" [online], [searched Nov. 21, 2014], Internet <URL: http://www.iza-structure.org/databases/>.

When the separation membrane 12 is a silica membrane, a carbon membrane or an organic/inorganic hybrid membrane, the average pore diameter may be calculated on the basis of Formula (1) below. In Formula (1), $d_p$ denotes the average pore diameter, f denotes the normalized Knudsen permeance, $d_{k,i}$ denotes the diameter of the molecule used in Knudsen diffusion testing, and $d_{k,He}$ denotes the diameter of a helium molecule.

$$f=(1-d_{k,i}/d_p)^3/(1-d_{k,He}/d_p)^3 \qquad (1)$$

The details of the calculation method for the average pore diameter or Knudsen diffusion testing are disclosed in Hye Ryeon Lee (et. al., (four others)), "Evaluation and fabrication of pore-size-tuned silica membranes with tetraethoxydimethyl disiloxane for gas separation", AIChE Journal, Volume 57, Issue 10, 2755 to 2765, October 2011.

For example, when the separation membrane 12 is a ceramic membrane, the average pore diameter may be calculated using a method of perm-porometry or a method of nano-perm porometry depending on the size of the pore diameter.

2. Casing 2

The casing 2 includes a main body 20, a supply passage 21, a first recovery passage 22 and a second recovery passage 23.

The main body 20 accommodates the separation membrane structure 1. The main body 20 may be configured by a metal member (for example, stainless steel, or the like). Both end portions of the separation membrane structure 1 are assembled into an inner portion of the main body 20 by O-rings 3. However, since there may be a leak from the periphery of the O-ring 3, that is to say, from the contact portion between the separation membrane structure 1 and the casing 2, it is necessary to perform a leak inspection by use of an inspection liquid. The leak inspection by use of an inspection liquid will be described below.

The supply passage 21 is a pipe for supplying a mixed liquid that is the object of a separation process to the main body 20. The supply passage 21 may be configured by a metal member (for example, stainless steel, or the like).

The first recovery passage 22 is a pipe for discharging a residual mixed liquid that has passed through a cell CL of the separation membrane structure 1 to an external portion. The first recovery passage 22 may be configured by a metal member (for example, stainless steel, or the like).

The second recovery passage 23 is a pipe for discharging a permeation component that has permeated the separation membrane 12 of the separation membrane structure 1 to an external portion. The second recovery passage 23 may be configured by a metal member (for example, stainless steel, or the like).

Method of Manufacturing Separation Membrane Module 10

An example of a method for manufacturing a separation membrane module 10 will be described.

1. Preparation of Porous Substrate 11

Firstly clay is prepared by adding water, a dispersant and an organic binder such as methyl cellulose to an aggregate and a binder, and then kneading.

Next, a monolithic green body is formed using the prepared clay in slip casting molding, press molding, or extrusion molding using a vacuum extruder.

Then, the monolithic green body is fired (for example, 500 degrees C. to 1500 degrees C., 0.5 hours to 80 hours) to form a porous substrate 11 having a plurality of cells CL.

2. Preparation of Separation Membrane 12

Next, the separation membrane 12 is formed on an inner surface of each cell CL of the porous substrate 11 (separation membrane formation step). A method that is adapted to the membrane type of the separation membrane 12 may be used in the formation of the separation membrane 12.

3. Assembly of Separation Membrane 12

O rings 3 are attached to both ends of the separation membrane structure 1 and are sealed into an inner portion of the casing 2 (assembly step).

4. Inspection of Separation Membrane Module 10

Next, the separation membrane module 10 is inspected. In the following description, a leak inspection of the periphery of the O rings 3, that is to say, with reference to the contact portion between the separation membrane structure 1 and the casing 2 will be described as an example of an inspection using an inspection liquid.

(1) Selection of Inspection Liquid

Firstly a method of selecting an inspection liquid for use in the leak inspection will be described.

The inspection liquid for use in the leak inspection is preferably characterized by not exhibiting a tendency to attach to the pores of the separation membrane 12. As a result, it is necessary to use the following method to confirm in advance that the inspection liquid will not tend to attach to the pores of the separation membrane 12.

Firstly the weight of the separation membrane structure 1 is measured.

Then an O-ring 3 is mounted onto the separation membrane structure 1 and sealed into the casing 2.

Figure 2:
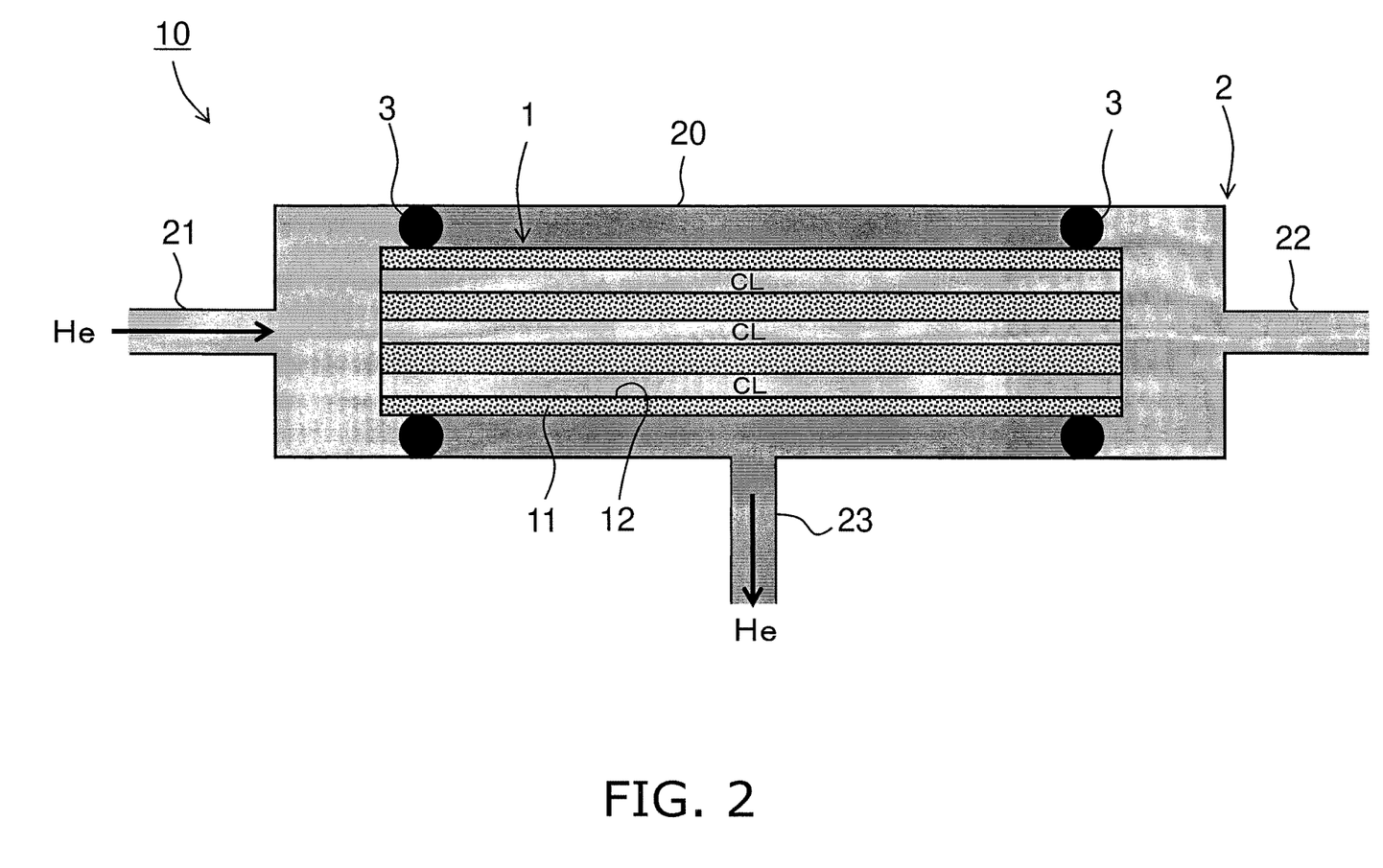
FIG. 2 is a perspective view describing a method of selecting an inspection liquid.

Next as shown in FIG. 2, He (helium) gas at 0.1 MPaG is supplied from the supply passage 21 to fill an inner portion of the main body 20. At that time, the first recovery passage 22 may be sealed by use of a seal valve.

Next, the He gas permeation rate [$nmol/m^2$ sPa] is measured on the basis of the permeation flow amount of He gas that has permeated the separation membrane 12 and flows out of the second recovery passage 23.

Figure 3:
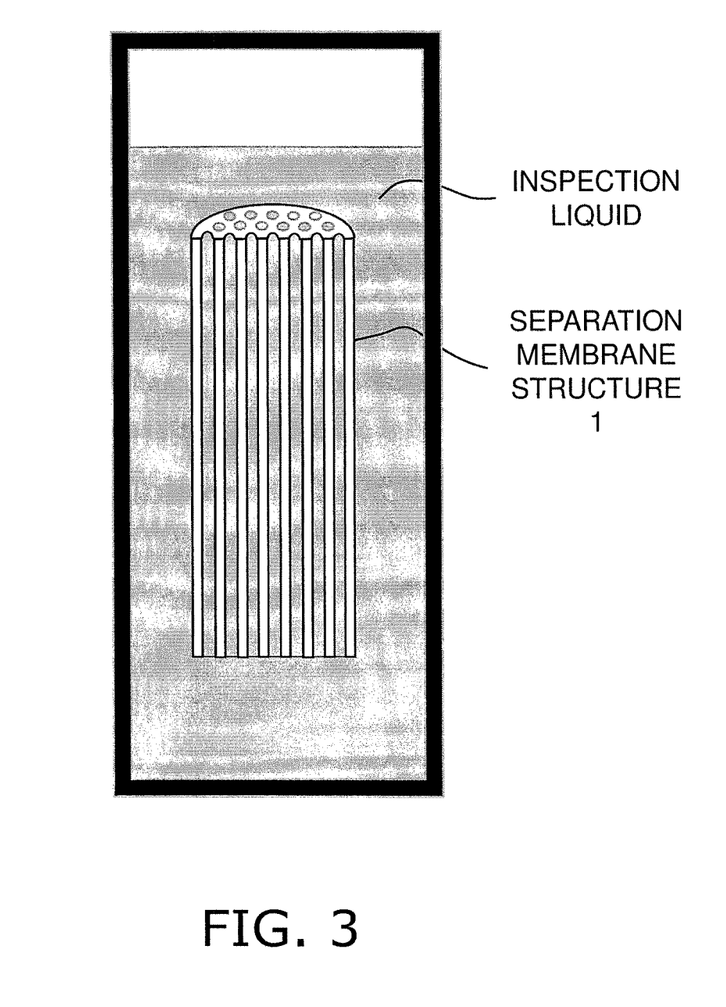
FIG. 3 is a perspective view describing a method of selecting an inspection liquid.

Then, the separation membrane structure 1 is removed from the casing 2, and as shown in FIG. 3, the separation membrane structure 1 is immersed in the inspection liquid for 60 minutes. However, the immersion may be such that the inspection liquid makes contact with the separation membrane 12, or may be a method in which the inspection liquid only fills an inner portion of the cells.

Figure 4:
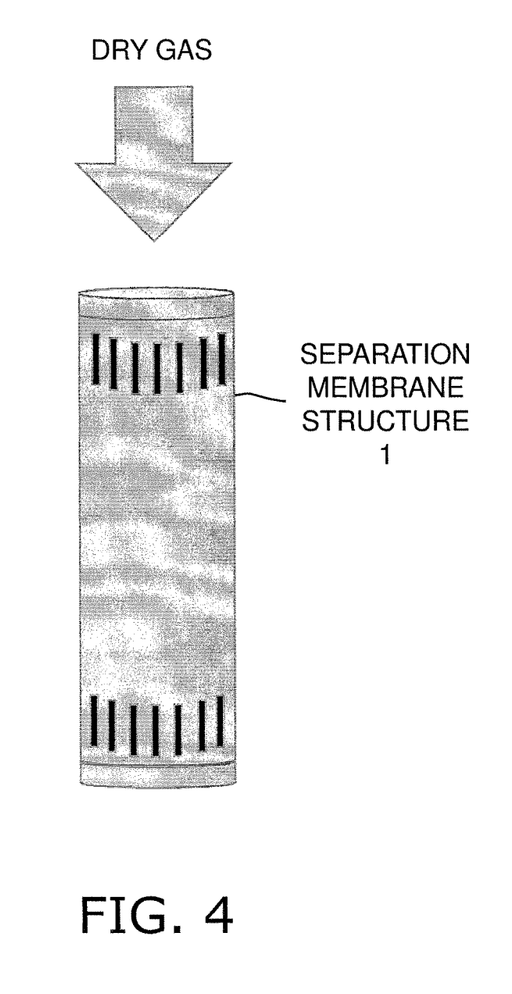
FIG. 4 is a perspective view describing a method of selecting an inspection liquid.

Next, as shown in FIG. 4, the separation membrane structure 1 is removed from the inspection liquid, and the separation membrane structure is dried in dry gas for 24 hours at 150 degrees C. The dry gas preferably does not contain moisture. More specifically, the water content ratio of the dry gas is preferably less than or equal to 500 ppm, and more preferably less than or equal to 100 ppm.

Next, the weight of the dried separation membrane structure 1 is reweighed to thereby confirm that the increase relative to the weight prior to immersion in the inspection liquid is less than or equal to 1%.

Next, O rings 3 are mounted on the separation membrane structure 1 for resealing in the casing 2.

Next, as shown in FIG. 2, He gas at 0.1 MPaG refills an inner portion of the main body 20 from the supply passage 21.

Next, the He gas permeation rate [$nmol/m^2$ sPa] is re-measured on the basis of the permeation flow amount of He gas that has permeated the separation membrane 12 and flows out of the second recovery passage 23.

Next, a reduction rate for the He gas permeation rate after immersion in the inspection liquid is calculated by dividing the He gas permeation rate that was measured after immersion to the inspection liquid by the He gas permeation rate that was measured prior to immersion to the inspection liquid.

When the calculated He gas permeation rate reduction rate is less than or equal to 10%, it is determined that the inspection liquid does not exhibit a tendency to attach to the pores of the separation membrane 12 and therefore is suitable for leak inspection. On the other hand, when the He gas permeation rate reduction rate is greater than 10%, a He gas permeation rate reduction rate may be calculated for another inspection liquid to thereby determine again whether or not a value of less than or equal to 10% is obtained.

As stated above, an inspection liquid that exhibits a characteristic that the He gas permeation rate reduction rate is less than or equal to 10% is varied in response to the type of separation membrane 12 or composition, or the like. For that reason, the inspection liquid may be selected and used in relation to the separation membrane 12 that is actually used without any particular limitation in relation to its type. For example, at least one type may be selected from fluorinated liquids and silicone liquids. The fluorinated liquid includes for example Fluorinert (registered trademark), Novec (registered trademark), Galden (registered trademark), or the like. The silicone liquid includes for example KF96L (manufactured by Shin-Etsu Chemical Co.), or the like. It is noted that Fluorinert is particularly preferred as the inspection liquid when commercial availability and handling characteristics are considered.

Furthermore, the vapor pressure of the inspection liquid at 25 degrees C. is preferably greater than or equal to $1.0 \times 10^3$ Pa. In this manner, the inspection liquid can rapidly evaporate after leak inspection as described below.

Furthermore, when a zeolite membrane in which $SiO_2/Al_2O_3$ is less than or equal to 200 is used as the separation membrane 12, it is preferred that the water content ratio in the inspection liquid is less than 20%. Since moisture attaches to the pores and the permeation rate tends to fall in a zeolite membrane in which $SiO_2/Al_2O_3$ is less than or equal to 200, a reduction in the permeation rate in particular can be inhibited by a configuration in which the water content ratio in the inspection liquid is less than 20%. The water content ratio in the inspection liquid is preferably less than or equal to 10% and in particular, preferably less than or equal to 5%.

Furthermore, the inspection liquid is preferably non-flammable. In this manner, an inspection using the inspection liquid can be safely performed.

The inspection liquid is preferably inert with respect to the separation membrane structure 1 and the casing 2. In this manner, the separation membrane 12 will not deteriorate as a result of a reaction with the inspection liquid and it is possible to inhibit corrosion as a result of a reaction between the casing 2 and the inspection liquid.

(2) Leak Inspection

Next, a detailed description will be given of leak inspection using an inspection liquid that has been selected using the method above.

As stated above in the assembly step, the separation membrane structure 1 is sealed in the casing 2.

Figure 5:
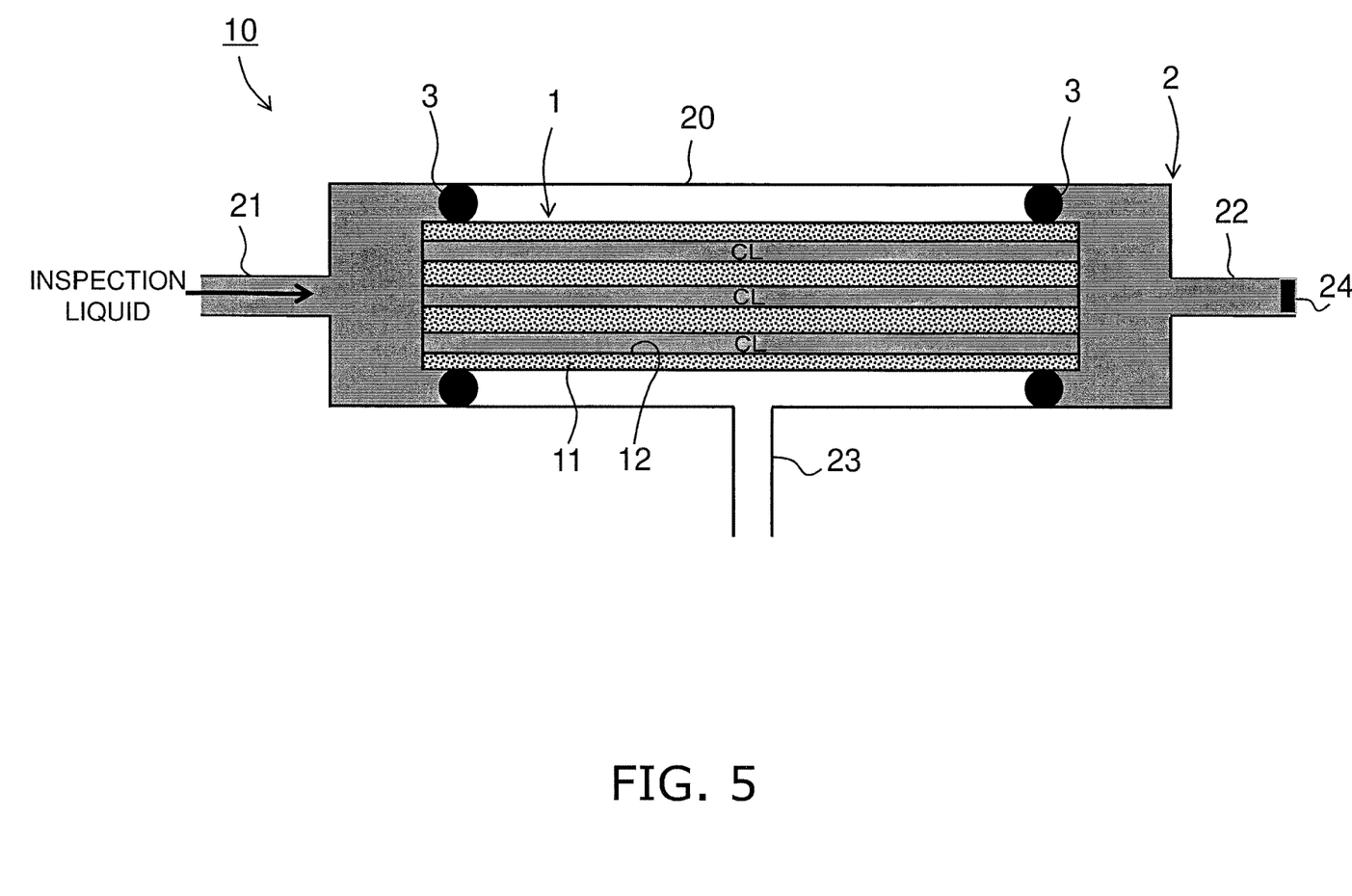
FIG. 5 is a perspective view describing a method of inspecting by use of an inspection liquid.

Firstly, as shown in FIG. 5, after sealing the first recovery passage 22 with a seal valve 24, the inspection liquid fills an inner portion of the main body 20 from the supply passage 21. In this manner, a configuration is created in which the inspection liquid is filled onto the first main surface side of the separation membrane 12.

Figure 6:
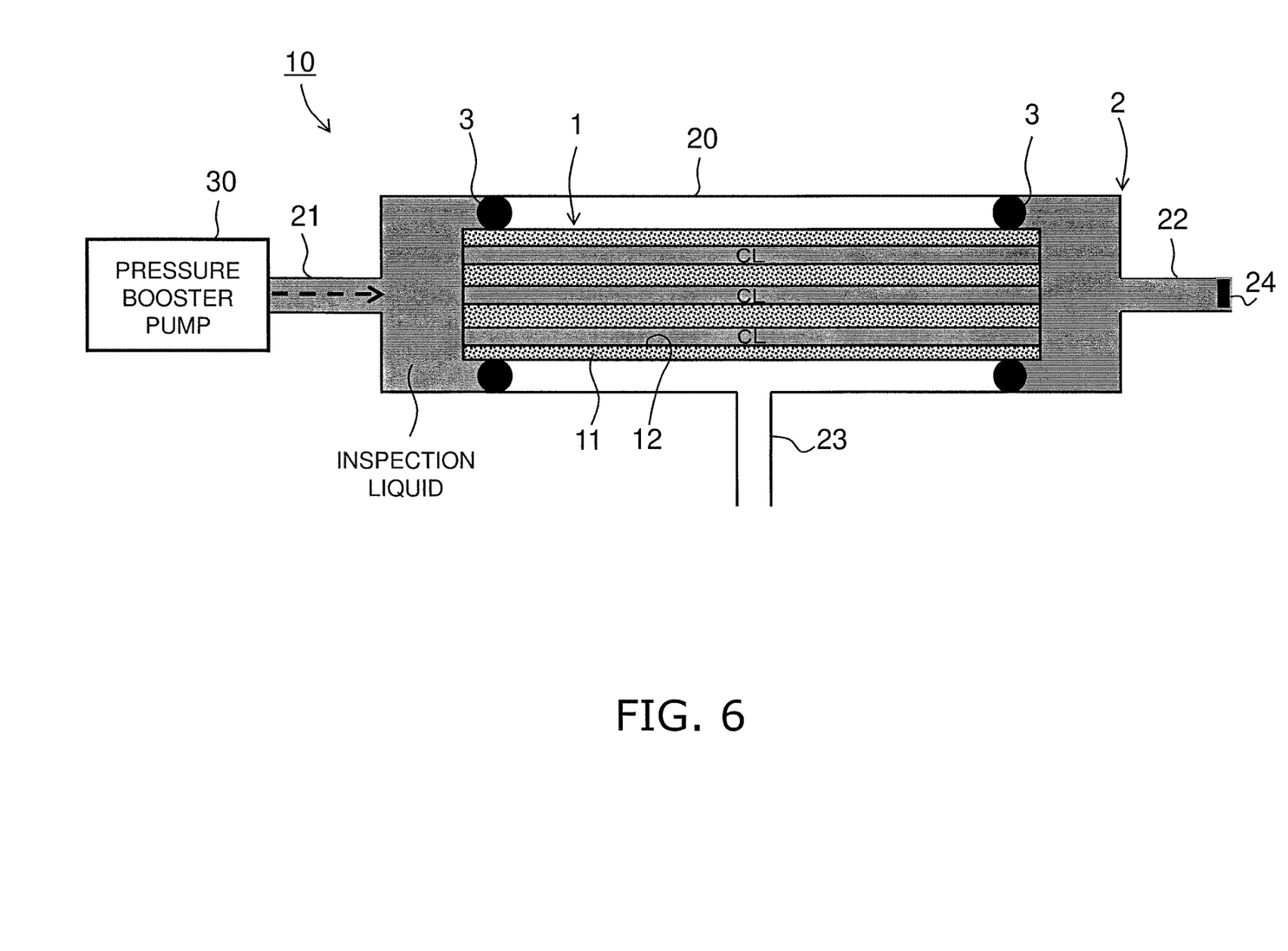
FIG. 6 is a perspective view describing a method of inspecting by use of an inspection liquid.

Next, as shown in FIG. 6, the inspection liquid that has been filled onto the first main surface side of the separation membrane 12 is pressurized to a predetermined pressure (for example, 1 MPa to 20 MPa) by use from the supply passage 21 of a pressure booster pump 30.

Then, operation of the booster pump 30 is stopped, the pressure on the inspection liquid is measured in real time and that configuration is maintained for a predetermined time (for example, 1 minute to 60 minutes).

The difference between the pressure at the commencement of measurement and the pressure after a predetermined time has elapsed is calculated, and that difference is used to determine the degree of leakage (inspection step).

Then, the seal valve 24 of the first recovery passage 22 is opened to thereby release the inspection liquid from the casing 2.

Next, the separation membrane 12 is dried in dry gas (drying step). At that time, it is preferred to dry the separation membrane 12 at less than or equal to the heat resistance limiting temperature of the O rings. When the separation membrane 12 is dried at less than or equal to the heat resistance limiting temperature of the O rings, the process is simplified since the separation membrane structure 1 can be dried without removal from the casing 2. Furthermore the dry gas preferably does not contain moisture. More specifically, the water content ratio of the dry gas is preferably less than or equal to 500 ppm, and more preferably less than or equal to 100 ppm.

The separation membrane module 10 is completed as described above.

Other Embodiments

Although an embodiment of the present invention has been described, the present invention is not limited to the above embodiment, and various modifications are possible within a scope that does not depart from the spirit of the invention.

In the present embodiment, a configuration has been described in which an inspection method that uses an inspection liquid according to the present invention was applied to leak inspection of the separation membrane module 10. However, application is possible with respect to various other inspection configurations. For example, the inspection method that uses an inspection liquid according to the present invention may be applied to the inspection of the separation membrane structure 1. The inspection of the separation membrane structure 1 for example is a strength test as disclosed in Japanese Patent Application Laid-Open No. 2014-46286. In this manner, when the inspection method that uses an inspection liquid according to the present invention is applied to the inspection of the separation membrane structure 1, after the separation membrane formation step, the formation of the separation membrane structure 1 can be deemed to be complete upon completion of the inspection step.

In the above embodiment, in the inspection step for the separation module 10, although leak inspection was performed with reference to pressure variation in the inspection liquid, there is no limitation in that regard. For example, leak inspection can be performed on the basis of at least one of the discharge amount from a pressurizing booster 30 that pressurized the inspection liquid, the compression amount, or the elapsed time until completion of pressurization. Alternatively, leak inspection may be performed on the basis of filling a gas into the second main surface side of the separation membrane 12 to create a foaming configuration in the inspection liquid when the gas is pressurized.

In the above embodiment, although the separation membrane 12 was directly formed on the porous substrate 11, one or a plurality of intermediate layers may be disposed between the separation membrane 12 and the porous substrate 11. The intermediate layer may be configured by the same material as the porous substrate 11. The pore diameter in the intermediate layer is preferably less than the pore diameter in the porous substrate 11.

Examples

Sample No. 1

1. Preparation of Separation Membrane Structure

Firstly 30 vol % of an inorganic binding material was added to 70 vol % of alumina particles (aggregate) having an average particle diameter of 12 μm. Then a molding auxiliary agent such as an organic binder or the like and a pore forming agent were added and dry mixed. Then water and a surface active agent were added, and mixed and kneaded to prepare a clay. The inorganic binding material includes use of talc, kaolin, feldspar, clay or the like having an average particle diameter of 1 to 5 μm to form a mixture of $SiO_2$ (70 mass %), $Al_2O_3$ (16 mass %), alkali earth metals and alkali metals (11 mass %).

Next, the clay was extrusion molded to thereby prepare a green body for a monolithic porous substrate. Then, the green body for the porous substrate was fired (1250 degrees C., one hour) to thereby obtain an alumina substrate having a plurality of cells.

Next, PVA (organic binder) was added to the alumina powder to prepare a slurry and thereby form a green body for the intermediate layer on an inner surface of the cells of the alumina substrate by a filtration method using the slurry. Then the green body for the intermediate layer was fired (1250 degrees C., 1 hour) to form the intermediate layer.

Next, both end surfaces of the alumina substrate were sealed with glass. In this manner, a monolithic porous substrate was completed.

Next, a separation membrane was formed with reference to the method disclosed in International Publication WO2011105511 in which a DDR-type zeolite membrane (average pore diameter: 0.40 nm) was formed on an intermediate layer of an inner surface of each cell of a porous substrate. In this manner, the separation membrane structure according to Sample No. 1 was completed in a configuration of a DDR-type zeolite membrane and a porous substrate that forms the DDR-type zeolite membrane.

2. Evaluation of Fluorinert as Inspection Liquid

Firstly, the weight of the separation membrane structure was measured.

Then, as shown in FIG. 2, the separation membrane structure was assembled into the casing. Next He gas at 0.1 MPaG was supplied from the supply passage to thereby measure the He gas permeation rate based on the permeation flow amount of He gas that flowed out of the second recovery passage. The He gas permeation rate before immersion in the inspection liquid was found to be 149 [$nmol/m^2$ sPa].

Then, the separation membrane structure was removed from the casing, and as shown in FIG. 3, the separation membrane structure was immersed for 60 minutes in Fluorinert as an inspection liquid.

Then as shown in FIG. 4, the separation membrane structure was lifted out of the Fluorinert and the separation membrane structure was dried for 24 hours in a dry gas at 150 degrees C. He was used as the dry gas.

Next, the weight of the dried separation membrane structure was re-measured and the increase amount relative to the weight prior to immersion in Fluorinert was confirmed to be less than or equal to 1%.

Then O rings were mounted onto the separation membrane structure for resealing into the casing 2. As shown in FIG. 2, He gas at 0.1 MPaG was supplied from the supply passage and the He gas permeation rate was measured on the basis of the permeation flow amount of He gas that outflows from the second recovery passage. The He gas permeation rate prior to immersion in Fluorinert was found to be 149 [nmol/m² sPa].

The reduction rate in the He gas permeation rate after immersion in Fluorinert was calculated by dividing the He gas permeation rate measured after immersion in Fluorinert by the He gas permeation rate measured before immersion in Fluorinert.

The reduction rate in the He gas permeation rate in the separation membrane structure in Sample No. 1 was found to be 0% and therefore confirmed the suitability of Fluorinert in leak inspection of a DDR-type zeolite membrane.

3. Leak Inspection

Firstly the separation membrane structure was sealed in the casing, and a mixed gas of $CO_2$ and $CH_4$ was supplied in advance to the DDR-type zeolite membrane to thereby measure the gas separation performance. The separation coefficient ($\alpha$) was 120 [nmol/m² sPa], and the $CO_2$ permeation rate was 744 [nmol/m² sPa].

Next as shown in FIG. 5, Fluorinert was filled from the supply passage. As shown in FIG. 6, a pressure booster pump on the supply passage side was used to create a pressure of 10 MPa in Fluorinert that had been filled onto the first main surface side of the separation membrane.

Then, the booster pump operation was stopped, the pressure of Fluorinert was measured in real time, that configuration was maintained for 10 minutes and then the degree of leakage was determined on the basis of the difference in the pressure at the commencement of measurement and the pressure after elapse of 10 minutes.

Next, Fluorinert was removed from the casing 2, and the DDR-type zeolite membrane was dried at 150 degree C. by supply of He as a dry gas from the supply passage.

4. Gas Separation Testing

After leak inspection as described above, a mixed gas of $CO_2$ and $CH_4$ was supplied to the DDR-type zeolite membrane to re-measure the gas separation performance in the same manner as the gas separation testing performed prior to leak inspection.

Fluorinert had a reduction rate for the He gas permeation rate of 0% and was used in Sample No. 1 to perform the leak inspection. The separation coefficient ($\alpha$) of the DDR-type zeolite membrane was 120 [nmol/m² sPa], and the $CO_2$ permeation rate was 744 [nmol/m² sPa]. That is to say, the reduction rate in the permeation rate and the separation coefficient after the leak inspection was 0%.

Sample No. 2

In Sample No. 2, a separation membrane structure that is the same as Sample No. 1 was prepared, and Galden (registered trademark) was used as the inspection liquid to thereby measure the reduction rate for the He gas permeation rate which was found to be −2%. Galden was confirmed as being suitable for use in leak inspection of a DDR-type zeolite membrane.

Furthermore, in the same manner as Sample No. 1, gas separation testing before and after leak inspection using Galden demonstrated a good value of 0% for the reduction rate for the permeation rate after leak inspection.

Sample No. 3

In Sample No. 3, a separation membrane structure that is the same as Sample No. 1 was prepared and KF96L (manufactured by Shinetsu Chemicals) was used as the inspection liquid to thereby measure the reduction rate for the He gas permeation rate which was found to be −8%. Therefore KF96L was confirmed as being suitable for use in leak inspection of a DDR-type zeolite membrane.

Furthermore, in the same manner as Sample No. 1, gas separation testing before and after leak inspection using KF96L demonstrated a good value of −5% for the reduction rate for the permeation rate after leak inspection.

Sample No. 4

With the exception of forming an AEI-type zeolite membrane (pore diameter: 0.38 nm) as a separation membrane, a separation membrane structure was prepared that was the same as Sample No. 1. The AEI-type zeolite membrane was prepared with reference to the method disclosed in International Publication WO2014/157324.

The reduction rate for the He gas permeation rate was measured using the same method as that used in Sample No. 1 and was found to be 0%. Therefore Fluorinert was confirmed as being suitable for use in leak inspection of an AEI-type zeolite membrane.

Furthermore, in the same manner as Sample No. 1, gas separation testing before and after leak inspection using Fluorinert demonstrated a good value of 0% for the reduction rate for the permeation rate after leak inspection.

Sample No. 5

With the exception of forming a silica membrane (pore diameter: 1.00 nm) as a separation membrane, a separation membrane structure was prepared that was the same as Sample No. 1. The silica membrane was prepared with reference to the method disclosed in International Publication WO2011118252.

The reduction rate for the He gas permeation rate was measured using the same method as that used in Sample No. 1 and was found to be 0%. Therefore Fluorinert was confirmed as being suitable for use in leak inspection of a silica membrane.

Furthermore, in the same manner as Sample No. 1, gas separation testing before and after leak inspection using Fluorinert demonstrated a good value of 0% for the reduction rate for the permeation rate after leak inspection.

Sample No. 6

With the exception of forming a carbon membrane (pore diameter: 0.3 nm) as a separation membrane, a separation membrane structure was prepared that was the same as Sample No. 1. The carbon membrane was prepared with reference to the method disclosed in International Publication WO2013145863.

The reduction rate for the He gas permeation rate was measured using the same method as that used in Sample No. 1 and was found to be 0%. Therefore Fluorinert was confirmed as being suitable for use in leak inspection of a carbon membrane.

Furthermore, in the same manner as Sample No. 1, gas separation testing before and after leak inspection using Fluorinert demonstrated a good value of 0% for the reduction rate for the permeation rate after leak inspection.

Sample No. 7

A separation membrane structure that is the same as Sample No. 1 was prepared and ion exchange water was used as the inspection liquid to measure the reduction rate for the He gas permeation rate which was found to be −28%. Therefore ion exchange water was confirmed as not being suitable for use in leak inspection of a DDR-type zeolite membrane.

Furthermore, using the same method as that used in Sample No. 1, gas separation testing before and after leak inspection using ion exchange water demonstrated an excessive value of −31% for the reduction rate for the permeation rate after leak inspection.

|  | Separation Membrane | | Inspection Liquid | | | Drying | | Evaluation |
|---|---|---|---|---|---|---|---|---|
|  | Type | Subtype | Type | Vapor Pressure Pa | Temp. °C. | Time (h) | Gas Atmosphere | Gas Type |
| No. 1 | Zeolite | DDR | Fluorinated Liquid | $1.3 \times 10^3$ | 150 | 24 | He | He |
| No. 2 | Zeolite | DDR | Fluorinated Liquid | $2.2 \times 10^3$ | 150 | 24 | He | He |
| No. 3 | Zeolite | DDR | Silicone Liquid | $5.0 \times 10^3$ | 150 | 24 | He | He |
| No. 4 | Zeolite | AEI | Fluorinated Liquid | $1.3 \times 10^3$ | 150 | 24 | He | He |
| No. 5 | Silica | — | Fluorinated Liquid | $1.3 \times 10^3$ | 150 | 24 | He | He |
| No. 6 | Carbon | — | Fluorinated Liquid | $1.3 \times 10^3$ | 150 | 24 | He | He |
| No. 7 | Zeolite | DDR | Water | $3.2 \times 10^3$ | 150 | 24 | He | He |

|  | Permeation Rate prior to Immersion in Inspection Liquid [nmol/m² s Pa] | Permeation Rate after Immersion in Inspection Liquid [nmol/m² s Pa] | Reduction Rate in Permeation Rate after Immersion in Inspection Liquid [%] | Reduction Rate in Permeation Rate as a result of Gas Separation Testing ($CO_2$/$CH_4$ Separation Testing) [%] |
|---|---|---|---|---|
| No. 1 | 149 | 149 | 0 | 0 |
| No. 2 | 155 | 152 | −2 | 0 |
| No. 3 | 154 | 142 | −8 | −5 |
| No. 4 | 369 | 369 | 0 | 0 |
| No. 5 | 847 | 844 | 0 | 0 |
| No. 6 | 300 | 300 | 0 | 0 |
| No. 7 | 148 | 107 | −28 | −31 |

As shown in Table 1, in Sample No. 1 to Sample No. 6, leak testing was performed using an inspection liquid that exhibits the characteristic of having a reduction rate for the He gas permeation rate of less than or equal to 10% when a separation membrane structure is immersed for 60 minutes and then dried for 24 hours at 150 degrees C. Sample No. 1 to Sample No. 6 inhibited a reduction in the permeation rate after leak inspection. This feature is due to the fact that the inspection liquid during leak inspection could be inhibited from attaching to the pores of the separation membrane since the selected inspection liquid was adapted to each of the separation membranes.

On the other hand, Sample No. 7 showed a large reduction in the permeation rate after leak inspection since the inspection liquid during leak inspection became attached to the pores of the separation membrane.

The invention claimed is:

1. A method for inspecting a separation membrane structure having a porous substrate and a separation membrane, the method comprising:
    an inspection step of applying pressure to an inspection liquid that has filled a first main surface side of the separation membrane, and wherein
    the inspection liquid is characterized in that a reduction rate of an He permeation rate of the separation membrane is less than or equal to 10% when the separation membrane structure has been dried for 24 hours at 150 degrees C. after immersion in the inspection liquid for 60 minutes.

2. The method for inspecting a separation membrane structure according to claim 1, wherein
    a leak inspection in the inspection step is performed on the basis of a pressure change in the inspection liquid.

3. The method for inspecting a separation membrane structure according to claim 1, wherein
    the inspection liquid in the inspection step is pressurized using a pressure booster, and
    a leak inspection in the inspection step is performed on the basis of at least one of a discharge amount from the pressure booster, a compression amount, or an elapsed time until completion of pressurization.

4. The method for inspecting a separation membrane structure according to claim 1, wherein
    a leak inspection in the inspection step is performed on the basis of a foaming configuration in the inspection liquid when a gas that has filled a second main surface side of the separation membrane is pressurized.

5. The method for inspecting a separation membrane structure according to claim 1, wherein
    a vapor pressure of the inspection liquid at 25 degrees C. is greater than or equal to $1.0 \times 10^3$ Pa.

6. The method for inspecting a separation membrane structure according to claim 1, wherein
    the inspection liquid is a fluorinated liquid.

7. The method for inspecting a separation membrane structure according to claim 1 further comprising:
    a drying step of drying the separation membrane at less than or equal to a heat resistance limiting temperature of O rings after the inspection step.

8. The method for inspecting a separation membrane structure according to claim 1, wherein
    the separation membrane is a zeolite membrane in which $SiO_2$/$Al_2O_3$ is less than or equal to 200.

9. The method for inspecting a separation membrane structure according to claim 8, wherein
    the water content ratio in the inspection liquid is less than 20%.

10. A method for manufacturing a separation membrane module, the method comprising:
    an assembly step of sealing a separation membrane structure that includes a porous substrate and a separation membrane into a casing, and
    an inspection step of applying pressure to an inspection liquid that has filled a first main surface side of the separation membrane, and wherein
    the inspection liquid is characterized in that a reduction rate of an He permeation rate of the separation membrane is less than or equal to 10% when the separation membrane structure has been dried for 24 hours at 150 degrees C. after immersion in the inspection liquid for 60 minutes.

11. A method for manufacturing a separation membrane structure, the method comprising:
- a separation membrane formation step of forming a separation membrane on a surface of a porous substrate, and
- an inspection step of applying pressure to an inspection liquid that has filled a first main surface side of the separation membrane, and wherein
- the inspection liquid is characterized in that a reduction rate of an He permeation rate of the separation membrane is less than or equal to 10% when the separation membrane structure has been dried for 24 hours at 150 degrees C. after immersion in the inspection liquid for 60 minutes.

* * * * *